July 22, 1924.

F. P. GLOSH 1,502,467

AUTOMATIC SCREW MACHINE

Filed Feb. 28, 1921

INVENTOR:
Frederick P. Glosh

BY Allen & Allen
ATTORNEYS.

July 22, 1924.

F. P. GLOSH 1,502,467

AUTOMATIC SCREW MACHINE

Filed Feb. 28, 1921

INVENTOR:
Frederick P. Glosh.
BY
Allen & Allen
ATTORNEYS.

July 22, 1924.  
F. P. GLOSH  
AUTOMATIC SCREW MACHINE  
Filed Feb. 28, 1921  
1,502,467  
7 Sheets-Sheet 5

INVENTOR:  
Frederick P. Glosh.  
BY  
ATTORNEYS.

July 22, 1924.

F. P. GLOSH

1,502,467

AUTOMATIC SCREW MACHINE

Filed Feb. 23, 1921

INVENTOR:
Frederick P. Glosh
BY Allen & Allen
ATTORNEYS.

Patented July 22, 1924.

1,502,467

UNITED STATES PATENT OFFICE.

FREDERICK P. GLOSH, OF CINCINNATI, OHIO, ASSIGNOR TO THE CINCINNATI PLANER COMPANY, OF OAKLEY, CINCINNATI, OHIO, A CORPORATION OF OHIO.

AUTOMATIC SCREW MACHINE.

Application filed February 28, 1921. Serial No. 448,366.

*To all whom it may concern:*

Be it known that I, FREDERICK P. GLOSH, a citizen of the United States, and a resident of Cincinnati, in the county of Hamilton and State of Ohio, have invented certain new and useful Improvements in Automatic Screw Machines, of which the following is a full, clear, and exact description, reference being had to the accompanying drawings, forming part of this specification.

My invention relates to automatic screw machines and the like, and has particular reference to the end tool feed and operation in such machines.

In the reciprocation of the end tools, in screw machines, any inaccuracy of alignment or roughness in operation resulting from wear in the slide or the parts imparting motion thereto, shows at once in the quality of work produced, and thus in one of its phases my invention relates to the means of mounting, and particularly of imparting motion to the tool slide or "end tool slide" as it is called, entirely avoiding the common defects resulting in looseness and wear and providing a feed by means of a rock shaft and lever, instead of directly making contact with a cam.

In this connection also, it is my object to provide an adjustable feed, readily set by means of graduations or calibrations which will at a glance indicate the distance of throw imparted to the tool slide.

Another object of my invention is the provision of a unit mounting for the tool slide, which is readily separable from the bed, thereby greatly facilitating the replaning of the bearing parts, when the machine is in use, and making it much easier to repair said bearing surfaces and assemble the machine, when it is being produced.

In connection with the slide itself, I provide for a unitary cylindrical projection, having grooves therein for the reception of T bolts, said projection supporting such as box tools and turners at different points and fastening same by means of said T bolts. This enables me to provide a very simple and easy way to utilize such tools in an automatic screw machine, and provides a very strong and easily manufactured tool support.

The revolving parts in the slide are provided, in my invention, with a simple means to lock them and the construction of the slide in general is such as to facilitate its manufacture, installation and repair.

The above objects and other advantages to be noted, I accomplish by that certain construction and arrangement of parts to be hereinafter more specifically pointed out and claimed.

Figure 1:
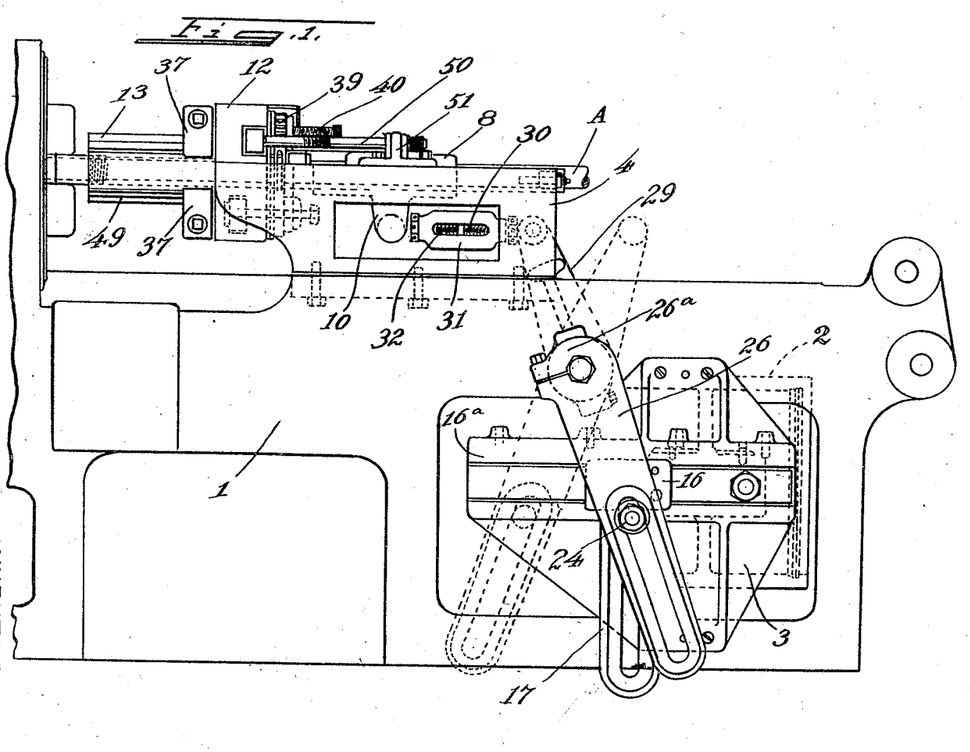
Figure 1 is a side elevation of the whole device.
Figure 2:
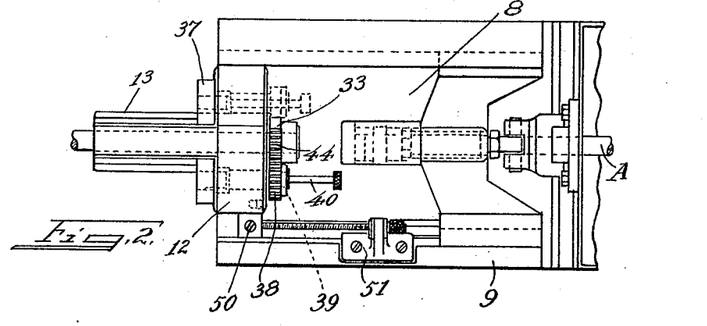
Figure 2 is a top plan view of the slide itself.

Dealing first with the machine in its general aspects, it will be noted that the frame at 1, Figure 1, has mounted adjacent the cam drum 2, a heavy bracket 3, which carries the slide operating lever 17. It is on this bracket that all twists and strains resulting from the contact of cams on cam drum 2 are borne, in view of the method of imparting motion, as will be further noted.

Figure 9:
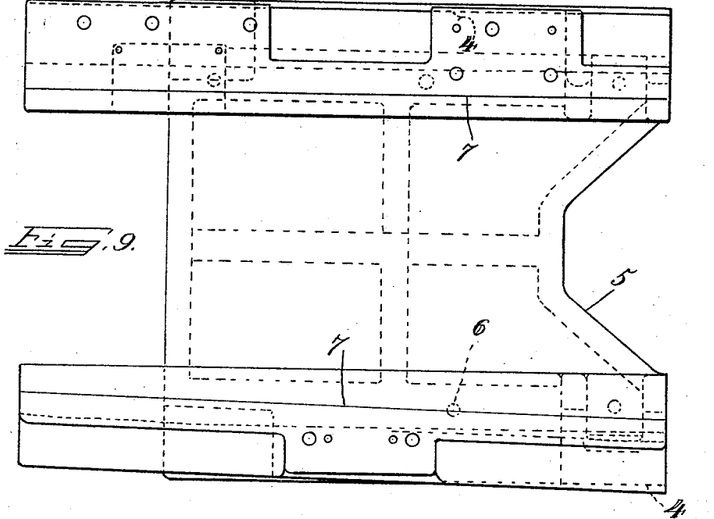
Figure 9 is a top plan view of the unit mounting or saddle.
Figure 10:
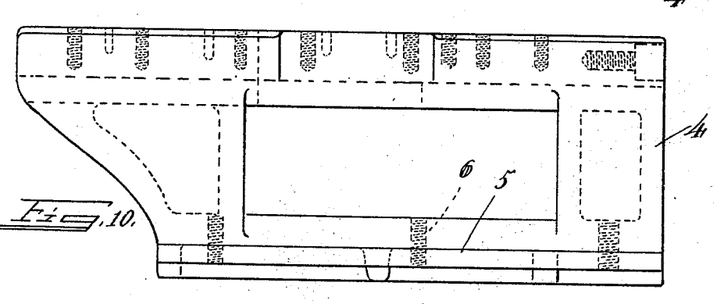
Figure 10 is a side elevation of said saddle.
Figure 11:
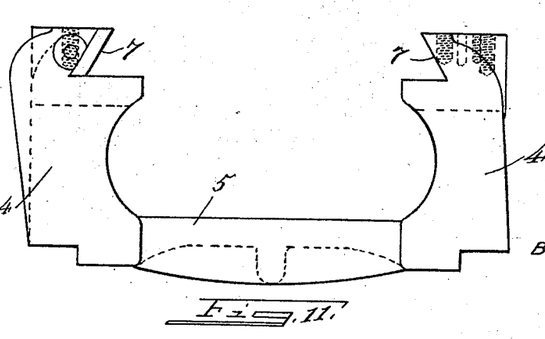
Figure 11 is an end view thereof.
Figures 12, 13, 14, 15:
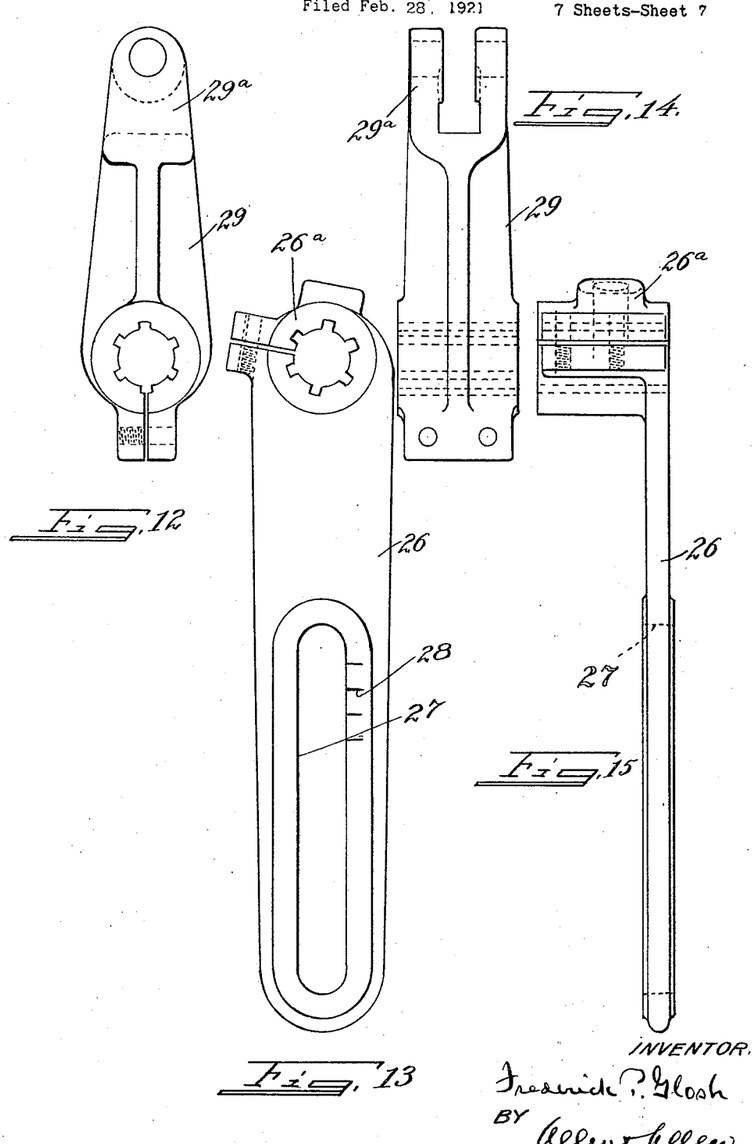
Figure 12 is a side view of the upper portion of the slide operating lever.
Figure 13 is a side elevation of the adjustable lower portion of said lever.
Figure 14 is an edgewise view of the part shown in Figure 12.
Figure 15 is an edgewise view of the part shown in Figure 13.
Figure 17:
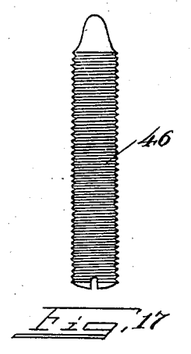
Figure 17 is a view of one of the locking screws for the slide gears.

Mounted on top of the frame 1 is a saddle or unit mounting piece, (Figures 9–10–11) having sides 4, 4, and a base 5, the base being tapped with holes 6 by means of which the piece is firmly bolted or screwed down to the frame. At the upper ends of the sides are formed the planed V's 7, on which the slide reciprocates, and it will be noted that this piece carries the entire slide, and can be removed with the slide in one piece, for purpose of repairs. Furthermore, in contradistinction to known machines of this type, the manufacturer or user does not need to provide for planing off the V's, by placing the whole machine in a large planer, but may simply remove the saddle and treat it separate and apart from the rest of the machine.

Figure 6:
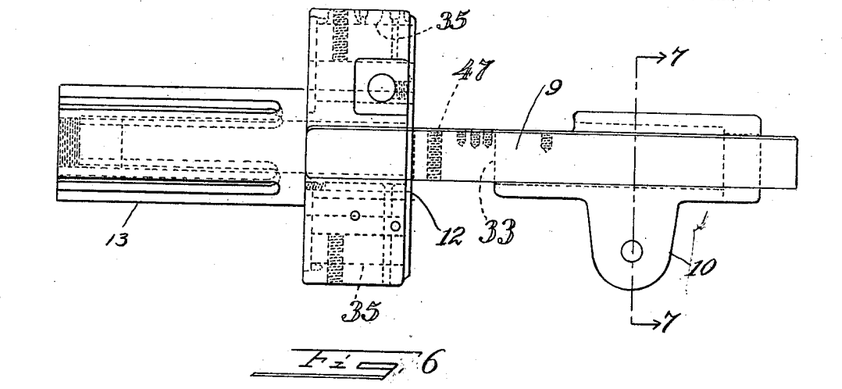
Figure 6 is a side elevation of the slide.
Figure 7:
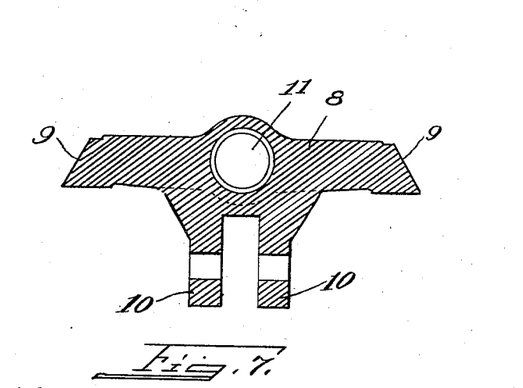
Figure 7 is a section on the line 7—7 of Figure 6.

The slide itself is formed of a casting, having a body 8, with V's 9, (Figures 6–7) formed thereon, which last fit the V's in the saddle. It has projecting ears 10, 10, which form a trunnion for the operating element and has a central clearance 11, for the main shaft A of the machine which projects into it from the work feed parts.

The slide has a unitary head block 12, and projecting forward from the head, is a unitary cylindrical portion 13, which slides over the main shaft, as does the balance of the slide. As will be noted, this projection provides a means for mounting fixed tools in the head thereby adapting the machine for various kinds of work, aside from usual screw machine work.

*Slide reciprocating parts.*

In Figures 1, 4, and 12–16 and 18 are shown most clearly the operating parts for the tool slide, same being mounted on the heavy bracket 3, and made adjustable for length of throw, and limit of throw at the ends of its stroke.

It will be understood that the cam drum 2 is operated by means of a driven shaft 14, and will be equipped with the desired timing cams as in the usual type of automatic screw machines. The cam is not shown, but the usual type is mounted peripherally of the drum, and may be removed and other cams installed, dependent upon the machine requirements.

Riding on the cam is a roller 15, carried by a slide 16, said slide operating in suitable ways 16ª formed horizontally across the bracket 3. Secured to the outer face of the slide 16, is a depending slotted bar 17, which as the drum revolves will be fed to and fro, along with the slide, always maintaining its vertical position.

Figures 4, 16, 18:
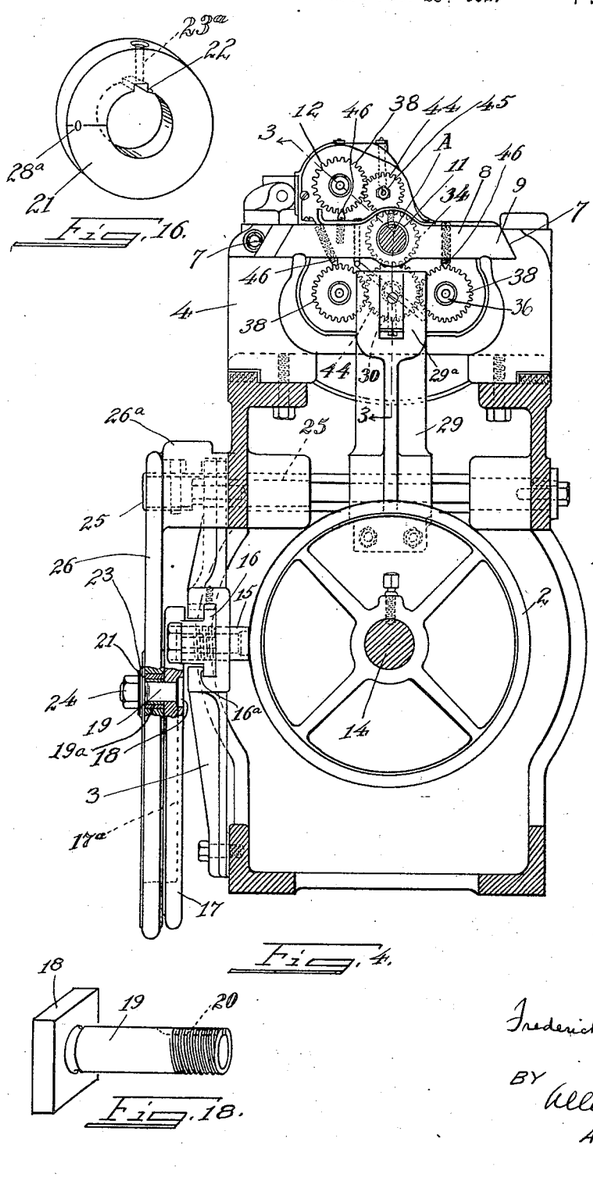
Figure 4 is a rear elevation of the complete device.
Figure 16 is a perspective view of the washer used with the lever shown in Figure 13.
Figure 18 is a perspective view of the adjusting bolt for the lever.
Figure 5:
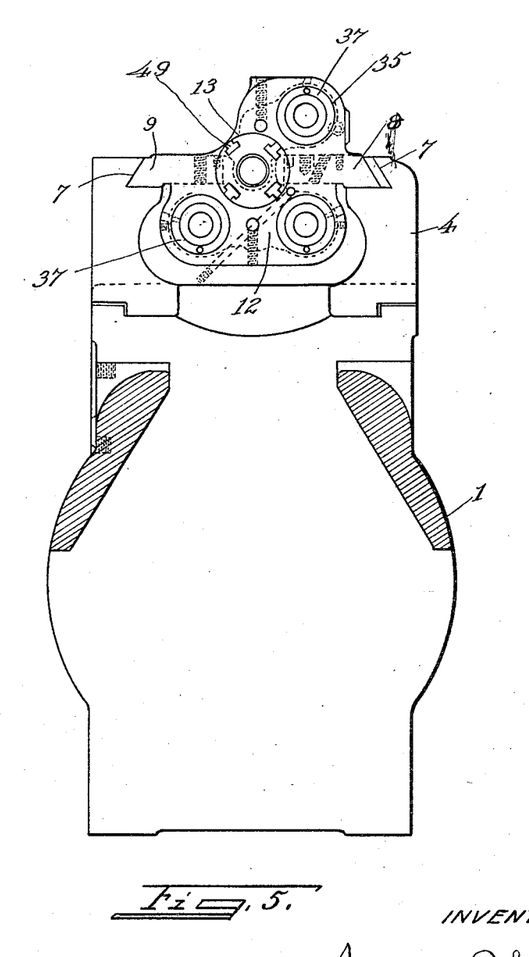
Figure 5 is a front elevation of the complete device.

At the inside of this bar 17 is a grooved-out portion 17ª which serves as a guide for the head 18 of a bolt 19 (Figure 18). This head is square and thus slides in but one plane, and the bolt at its outer end is cut with a key-way 20. At its outer end, this bolt carries a washer 21, (Figure 16) having a key-way 22 therein, to engage a key 23, this washer being held on the bolt by a nut 24 of desired type, and the key secured into the radial hole 23ª.

Mounted across the sides of the frame 1 in suitable bearings is a rock shaft 25, having a ribbed end over which is fixedly clamped the end 26ª of a lever 26. This lever extends down across the bar 17 and has a slotted lower end as at 27, this end having graduations 28 thereon, which are calibrations indicating resultant length of throw, upon adjustment of the sliding bolt 19 above noted. The calibrations 28 may be equal in spacing and a chart provided to read in units of length of tool slide movement for different sized cams.

This bolt 19 extends through the slot 27 and the washer 21 bears against the bushing 19ª of the bolt, so that the bolt may be adjusted along in its mounting in the bar 17, and clamped in any desired position therein thereby changing the point of engagement with the lever 26 the bushing being in abutment with the face of the bar 17. The lever 26 can then slide and rotate on the bushing of the bolt.

It will be noted that the washer has a mark or zero formed on its exposed face as at 28ª and since the washer does not revolve and the bolt does not revolve, the said indication mark will travel along the calibrations on the face of the lever, serving as a guide to the operator when making adjustment to change the travel of the tool slide.

At the center of the rock shaft 25 is another lever 29, which is likewise clamped over a ribbed portion of the said rock shaft, so as to take an absolutely fixed position thereon, and this lever has a trunnion 29ª pivotally connected to the screw member 30 of a turn buckle 31.

The other screw member 32 of this turn buckle is pivoted between the ears or trunnion that depends from the tool slide, and the turn buckle operates in the usual manner of structures of its description.

As now described, it is evident that the position of the lever 26 in the depending bar 17, will determine the position of the rock shaft at the ends of the stroke of the slide 16, in the side bracket 3. The position of the rock shaft with relation to the position of the tool slide can be regulated by the turn buckle.

Thus the operator in adjusting the machine will move the tool slide to the desired extreme position of its feed, adjust the sliding bolt to the desired position in the slotted end of the lever 26, and turn the buckle during these adjustments to compensate for the movements of the rock shaft due to the changing of position of the lever 26. He will then have a feed of exactly the desired length with the desired forward limit of the stroke, a matter which so far as I am advised has never before been possible in machines of this character.

Not only this, but due to the face that the slide is operated from a lever connected to a rock shaft and operating in the central vertical plane of the slide, such wear as may occur will not become evident in the action of the machine, as would be the case in machines with which I am familiar.

The strains incident to the operation of the machine will be transmitted from the rock shaft by means of the lever 26 to the bracket and its depending arm, said arm being directly operated by a force applied along the axis of the cam engaging roller.

I thus confine the twisting strains in my machine to the bracket and the parts thereon, and remove it from the part directly connected to the slide itself.

*The tool slide.*

Referring next more specifically to the tool slide itself (shown in all assembly views), it will be recalled that the body 8, head block or portion 9, and cylindrical extension 13, have been referred to, together with the fact that extending centrally through the slide, and given sufficient clearance was the main drive shaft A. It should be noted of the extension and the slide that they are supported on the saddle structure and on suitable ways, and do not bear to any extent against the main shaft.

Figure 3:
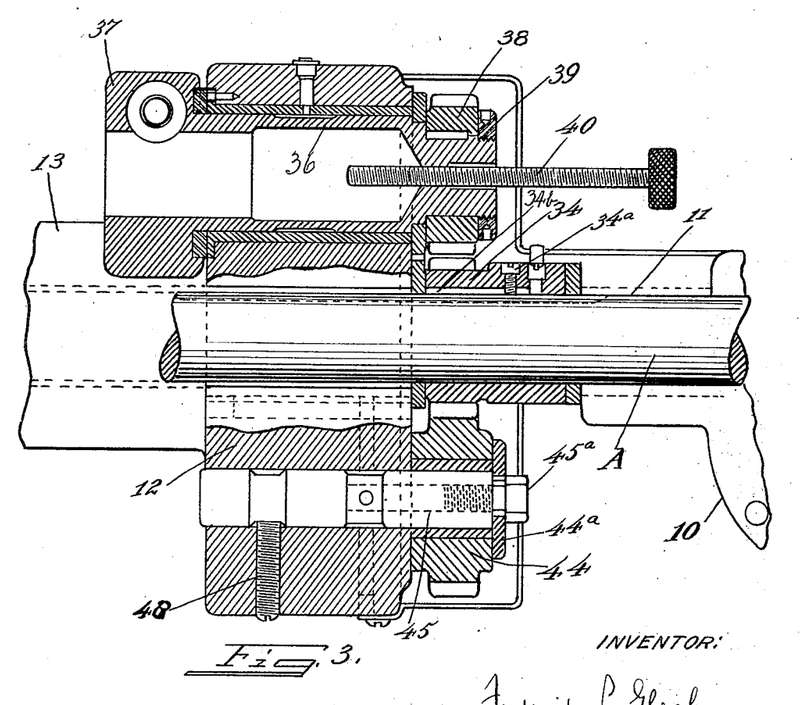
Figure 3 is a section on a larger scale than Figure 2 taken on a central vertical plane thereof.

Mounted over the shaft A, within a space 33, left therefor, in the slide casting (Figure 6) is the drive gear 34, (Figure 3) for revolving the tools in the head of the slide. This gear has a key 34ᵇ secured by a radial screw pin 34ᵃ, said key sliding in a keyway in the shaft. There have been shown three tool holding positions in all, and the fourth space, not provided for in the head, is preferably utilized for another sort of mechanism having its own connections, and designed for special work such as threading and tapping.

The head is formed with holes 35, 35, for the tool spindle holders 36, which have their forward ends expanded as at 37, and extend through the rear of the slide head. The gears 38 for the holders, which cause them to revolve are mounted and keyed on the rear exposed ends of the holders, and the gear and holder assembly held in place by means of nuts 39.

Figure 8:
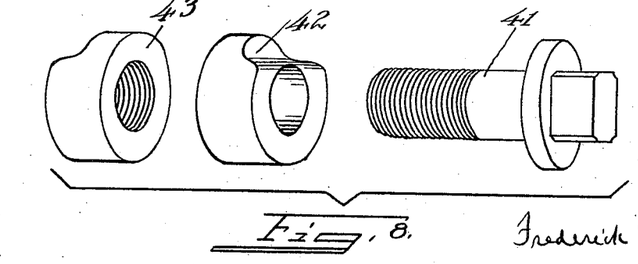
Figure 8 is a detail perspective of the tool engaging clamp used in the spindles or sockets with the clamp pieces reversed as to normal position.

The tool adjusting screws 40 thread into the rear ends of the spindles, and the tool shank engaging clamps or binders comprise screws 41, (Figure 8) which carry the shank engaging or clamping binder tools 42, 43, the latter being internally threaded.

There are two idler gears 44, mounted on the head of the slide by means of pins 45 (Figure 3), which said two gears are in mesh with the main gear 34, on the shaft A. These idlers mesh with the gears 38 of the holders and when it is desired to lock the holders against any motion, I provide screws 46, which are threaded into the main body 8 of the slide, as in the holes 47 therein, which said screws engage the teeth of the tool spindle holder gears.

Then in order to cut off the drive from the main gear, I provide for easy removal of the idlers by removing the screws 48 and washers 44ᵃ from the pins or shafts 45 and thus removing the gears 44 entirely.

The cylindrical extension 13 which protrudes forwardly from the head portion of the slide is provided with T-slots 49, which serve to support against motion, the bodies of tools which are desired to hold fixedly against the work, such as turners and box tools. The shanks of the latter tools may be inserted into the holders above described, and will be supported on the cylindrical portion, and by locking the holders, the shanks will be held in a fixed and rigid position.

Due to the cylindrical shape, the extension will not have any corners to interfere with full clearance for the usual tools, and it is easier to manufacture when round in its general conformation. Otherwise its exact shape is not of importance.

I have not attempted to describe the various oil holes, bushings, gibs, stops and the like, since these may be provided for as per the desires of the builder and user, and are mere mechanical parts not particularly involved in my invention. The stop or bumper 50, held on the bracket 51, on the slide carrying saddle, is prominent in the drawings, and for this reason I have indicated and numbered it.

I do not desire because of the omission of mention of various equivalent structures which may be substituted for those specifically described above, to thereby exclude from the intended scope of my claims that follow, all those obvious changes and modifications which would occur to those skilled in the art involved.

Having thus described my invention, what I claim as new and desire to secure by Letters Patent, is:—

1. In an automatic screw machine, the combination with a frame, an end tool slide or the like, a rock shaft supported by the frame and extending across beneath the path of the slide, a lever on the shaft, and a turn buckle serving as a link between the lever and the slide, said lever being on substantially the center line of the slide.

2. In an automatic screw machine or the like, the combination of a frame and an end tool slide or the like, trunnions depending from the slide, a rock shaft on the frame, and lever and link connection from the rock shaft to the trunnion.

3. In an automatic screw machine, a tool slide, a frame on which it slides, a rocking element connected to the slide to cause it to move, extendible connection between the rocking element and the slide, an energized reciprocating member on the frame at one side thereof, and connection from the said member to the rocking element, said connection being adjustable for length of throw imparted to the rocking element from a uniform movement of the reciprocating member.

4. In an automatic screw machine, a frame, a tool slide, a bracket on the frame, a slide on the bracket, contact means on the slide for a cam device, a depending arm rigid with the slide, a lever for transmitting motion from the slide on the bracket to the tool slide, means for connecting the lever in a pivotal manner at various points along the depending arm, and connections extending from a fixed center for the lever to the tool slide.

5. In an automatic screw machine, a frame, a tool slide, a bracket on the frame, a slide on the bracket, contact means on the slide for a cam device, a depending arm rigid with the slide, a lever for transmitting motion from the slide on the bracket to the tool slide, means for connecting the lever in a pivotal manner at various points along the depending arm, and connections extending from a fixed center for the lever to the tool slide, said connecting means for the lever to the depending arm having calibrations to guide the operator.

6. In an automatic screw machine, a frame, a tool slide, a bracket on the frame, a slide on the bracket, contact means on the slide for a cam device, a depending arm rigid with the slide on the bracket to the tool slide, means for connecting the lever in a pivotal manner at various points along the depending arm, and connections extending from a fixed center for the lever to the tool slide, said last mentioned connections being adjustable for length.

7. In an automatic screw machine, the combination with a frame, a tool slide, a reciprocated part, and a lever for transmitting motion from the reciprocating part to the tool slide, said part having a slot therein, and said lever having a slot therein, a bolt adapted to slide but not revolve in one of the slots, a nut for the bolt to clamp the other slotted portion to the one in which the bolt is mounted, and a washer on the bolt intermediate the nut and the portion clamped thereby, said washer being adapted to slide but not revolve on the bolt, and calibrations on the said clamped portion, and an indicating mark on the washer, for the purpose described.

8. In an automatic screw machine, the combination with a frame, a tool slide, a cam device, a bracket or the like having a slideway therein, a slide mounted to reciprocate in the slideway, anti-friction means on the slide to engage the cam device, a depending arm on the slide located in the vertical plane of the anti-friction means axis, and a lever, having connections from a fixed center for imparting motion to the tool slide, and adjustable pivotal connections to the depending arm of the slide.

9. In a machine of the character described, the combination of a tool slide, tool holders in the tool slide, a shaft over which the slide moves in a path to and from the work, connections from the shaft to the tool holders to revolve them, and means for locking the tool holders against movement, and dis-connecting them from the said shaft, whereby fixed tools may be held in said holders.

10. In a machine of the character described, the combination of a tool slide, tool holders in the tool slide, a shaft over which the slide moves in a path to and from the work, connections from the shaft to the tool holders to revolve them, and means for locking the tool holders against rotation, and dis-connecting them from the said shaft, whereby fixed tools may be held in said holders, and means on the slide for providing a rest to fixed tools mounted in said holders.

11. In a machine of the character described, the combination of a tool slide, tool holders in the tool slide, a shaft over which the slide moves in a path to and from the work, connections from the shaft to the tool holders to revolve them, and means for locking the tool holders against movement, and dis-connecting them from the said shaft, whereby fixed tools may be held in said holders, and means on the slide for providing a rest to fixed tools mounted in said holders, said means comprising a projection from the forward end of the slide, having tool engaging grooves therein.

12. In a machine of the character described, the combination of a tool slide, tool holders in the tool slide, a shaft over which the slide moves in a path to and from the work, connections from the shaft to the tool holders to revolve them, and means for locking the tool holders against movement, and dis-connecting them from the said shaft, whereby fixed tools may be held in said holders, and means on the slide for providing a rest to fixed tools mounted in said holders, said means comprising a projection from the forward end of the slide, having tool engaging grooves therein, and having a cylindrical conformation, said means having a clearance space for the said shaft.

13. In a machine of the character described, a tool slide, a head therefor, a master gear for the head carried by the slide, and feathered on a shaft, idlers on the head intermeshing with said master gear, tool holders in the head, gears for the tool holder meshing with the idler gears, said idler gears being removably mounted, and means for locking the gears for the tool holders, whereby the holders may be held in a fixed position.

14. In an automatic screw machine, a tool slide, having interspaced apertures therein for tool holders, work holders mounted in said apertures, said tool holders having gears thereon, a master gear carried by the slide and driven from a feathered shaft for revolving the tool holder gears, said work holder gears having means for locking them in fixed position.

15. In an automatic screw machine, a tool slide, having interspaced apertures therein for tool holders, work holders mounted in said apertures, said tool holders having gears thereon, a master gear carried by the slide and driven from a feathered shaft for revolving the tool holder gears, said work holder gears having means for locking them in fixed position, comprising pins arranged in the slide so as to extend into mesh with the selected teeth of said gears.

16. In an automatic screw machine, a tool slide, having a hole therein, a tool holder having an expanded end, and otherwise fitting with said hole, a gear fixedly mounted on the said extending end, and a nut over the end of the holder abutting said gear and holding it and the holder in position in the slide.

17. In an automatic screw machine, a tool slide, having a hole therein, a tool holder having an expanded end, and otherwise fitting with said hole, a gear fixedly mounted on the said extending end, and a nut over the end of the holder abutting said gear and holding it and the holder in position in the slide, said expanded end of the holder having clamping means therein for engaging the shank of a tool.

18. In an automatic screw machine, a tool slide, having a hole therein, a tool holder having an expanded end, and otherwise fitting with said hole, a gear fixedly mounted on the said extending end, and a nut over the end of the holder abutting said gear and holding it and the holder in position in the slide, and means on the slide adapted to enter into locking engagement with the teeth of the said gear to prevent movement of the holder.

19. In an automatic screw machine, a tool slide, having a hole therein, a tool holder having an expanded end, and otherwise fitting with said hole, a gear fixedly mounted on the said extending end, and a nut over the end of the holder abutting said gear and holding it and the holder in position in the slide, and means on the slide adapted to enter into locking engagement with the teeth of the said gear to prevent movement of the holder, said means comprising a screw, located in the plane of the said gear, and mounted in the slide.

20. In a machine of the character described, a tool slide, a driving shaft, a gear feathered on said shaft and movable with the slide, work gears for revolving tools, mounted on the head, and idlers meshing with the gear on the shaft, and with the work gears, said idlers being removably mounted on the slide and means on the slide for locking the work gears.

21. In a machine of the character described, a tool slide, a driving shaft, a gear feathered on said shaft and movable with the slide, work gears for revolving tools, mounted on the head, and idlers meshing with the gear on the shaft, and with the work gears, said idlers being removably mounted on the slide and means on the slide for locking the work gears, the removable mounting for the idlers comprising pins for mounting the gears, sockets in the slide for the pins, and screws or the like for engaging grooves formed in the pins, as and for the purpose described.

22. In a machine of the character described, tool slide apertures in the slide, tool holders in the apertures and a fixed projection from the slide extending forwardly from the tool holders, said projection having tool mounting slots extending in line with the tool holders, whereby fixed tools may be held in the slots and in the holders, and means for locking the tool holders in fixed position, and for releasing them for revolution, as desired.

FREDERICK P. GLOSH.